US009701582B2

(12) United States Patent
Matsumoto (10) Patent No.: US 9,701,582 B2
(45) Date of Patent: *Jul. 11, 2017

(54) GLASS WELDING METHOD AND GLASS LAYER FIXING METHOD

(75) Inventor: Satoshi Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/511,688

(22) PCT Filed: Sep. 17, 2010

(86) PCT No.: PCT/JP2010/066139
§ 371 (c)(1),
(2), (4) Date: Jun. 13, 2012

(87) PCT Pub. No.: WO2011/065106
PCT Pub. Date: Jun. 3, 2011

(65) Prior Publication Data
US 2012/0240629 A1    Sep. 27, 2012

(30) Foreign Application Priority Data

Nov. 25, 2009    (JP) .............................. P2009-267593

(51) Int. Cl.
*C03C 27/06*    (2006.01)
*C03C 23/00*    (2006.01)

(52) U.S. Cl.
CPC .......... *C03C 27/06* (2013.01); *C03C 23/0025* (2013.01)

(58) Field of Classification Search
CPC  B32B 17/00; C03B 3/023; C03B 3/02; C03B 3/026

(Continued)

(56) References Cited

U.S. PATENT DOCUMENTS 3,453,097 A    7/1969  Hafner
3,663,793 A *  5/1972  Petro et al. .............. 219/121.69
(Continued)

FOREIGN PATENT DOCUMENTS

CN    1329395    1/2002
CN    1738777    2/2006
(Continued)

OTHER PUBLICATIONS

Hideaki Yasui et al. JP 20021220, Methodfor Manufacturing Image display device, manufacturing apparatus and image display device manufactured by using the same translated by: United States patent and trademark office Mcelroy translation company Jun. 2012.*

(Continued)

*Primary Examiner* — Jodi C Franklin
(74) *Attorney, Agent, or Firm* — Drinker Biddle & Reath LLP (57) ABSTRACT

When fixing a glass layer 3 to a glass member 4 by gasifying a binder and melting a glass fit 2, the glass layer 3 is irradiated with laser light L1 along a region to be fused R from an irradiation start position A in the region to be fused R to the irradiation start position A and then continuously again along an unstable region from the irradiation start position A to a stable region start position B in the region to be fused R, so as to re-melt the glass layer 3 in the unstable region, thereby removing the binder, thus turning the unstable region into a stable region, whereupon the glass layer 3 is fixed to the glass member 4.

4 Claims, 12 Drawing Sheets

(58) Field of Classification Search
USPC .......... 65/146–151, 138, 140, 155; 438/107, 438/455; 428/34; 156/99
See application file for complete search history.

(56) References Cited

U.S. PATENT DOCUMENTS

| | | | |
|---|---|---|---|
| 4,343,833 A | 8/1982 | Sawae et al. | |
| 5,489,321 A | 2/1996 | Tracy et al. | |
| 6,565,400 B1 | 5/2003 | Lee et al. | |
| 7,371,143 B2* | 5/2008 | Becken et al. | 445/25 |
| 7,641,976 B2* | 1/2010 | Lamberson et al. | 428/428 |
| 7,820,941 B2 | 10/2010 | Brown et al. | |
| 7,834,550 B2* | 11/2010 | Lee et al. | 313/512 |
| 7,932,670 B2* | 4/2011 | Yoo et al. | 313/505 |
| 8,063,561 B2* | 11/2011 | Choi et al. | 313/512 |
| 8,440,479 B2* | 5/2013 | Nguyen et al. | 438/29 |
| 8,490,434 B2* | 7/2013 | Watanabe et al. | 65/155 |
| 8,516,852 B2* | 8/2013 | Matsumoto et al. | 65/36 |
| 2004/0069017 A1* | 4/2004 | Li et al. | 65/43 |
| 2004/0207314 A1 | 10/2004 | Aitken et al. | |
| 2005/0103755 A1 | 5/2005 | Baker et al. | |
| 2006/0082298 A1 | 4/2006 | Becken et al. | |
| 2006/0084348 A1 | 4/2006 | Becken et al. | |
| 2007/0007894 A1* | 1/2007 | Aitken et al. | 313/512 |
| 2007/0053088 A1 | 3/2007 | Kranz et al. | |
| 2007/0128967 A1* | 6/2007 | Becken et al. | 445/25 |
| 2007/0170845 A1* | 7/2007 | Choi et al. | 313/504 |
| 2007/0173167 A1* | 7/2007 | Choi | 445/25 |
| 2008/0106194 A1 | 5/2008 | Logunov et al. | |
| 2008/0124558 A1 | 5/2008 | Boek et al. | |
| 2008/0135175 A1 | 6/2008 | Higuchi | |
| 2008/0182062 A1 | 7/2008 | Becken et al. | |
| 2009/0071588 A1 | 3/2009 | Kimura et al. | |
| 2009/0080055 A1 | 3/2009 | Baur et al. | |
| 2009/0086325 A1 | 4/2009 | Liu et al. | |
| 2009/0110882 A1 | 4/2009 | Higuchi | |
| 2009/0142984 A1 | 6/2009 | Logunov et al. | |
| 2009/0297861 A1* | 12/2009 | Banks et al. | 428/428 |
| 2009/0297862 A1* | 12/2009 | Boek et al. | 428/428 |
| 2009/0308105 A1 | 12/2009 | Pastel et al. | |
| 2010/0006228 A1* | 1/2010 | Abe et al. | 156/356 |
| 2010/0095705 A1* | 4/2010 | Burkhalter et al. | 65/61 |
| 2010/0116119 A1 | 5/2010 | Bayne | |
| 2010/0129666 A1 | 5/2010 | Logunov et al. | |
| 2010/0154476 A1* | 6/2010 | Becken et al. | 65/36 |
| 2010/0227524 A1* | 9/2010 | Jung | H01L 51/5246 445/25 |
| 2010/0267307 A1 | 10/2010 | Park et al. | |
| 2010/0304513 A1 | 12/2010 | Nguyen et al. | |
| 2011/0001424 A1 | 1/2011 | Logunov et al. | |
| 2011/0061789 A1* | 3/2011 | Matsumoto | 156/99 |
| 2011/0067448 A1* | 3/2011 | Matsumoto et al. | 65/36 |
| 2011/0072855 A1* | 3/2011 | Matsumoto et al. | 65/36 |
| 2011/0088430 A1* | 4/2011 | Matsumoto | 65/43 |
| 2011/0088431 A1* | 4/2011 | Matsumoto | 65/43 |
| 2011/0135857 A1 | 6/2011 | Logunov et al. | |
| 2011/0169108 A1* | 7/2011 | Gardner et al. | 257/417 |
| 2011/0223360 A1* | 9/2011 | Shibuya et al. | 428/34 |
| 2011/0223371 A1* | 9/2011 | Kawanami | 428/76 |
| 2011/0256407 A1 | 10/2011 | Boek et al. | |
| 2011/0265518 A1 | 11/2011 | Matsumoto et al. | |
| 2012/0111059 A1* | 5/2012 | Watanabe et al. | 65/43 |
| 2012/0147538 A1* | 6/2012 | Kawanami et al. | 361/679.01 |
| 2012/0151965 A1* | 6/2012 | Matsumoto et al. | 65/43 |
| 2012/0156406 A1* | 6/2012 | Banks et al. | 428/34.4 |
| 2012/0222450 A1* | 9/2012 | Lamberson et al. | 65/43 |
| 2012/0234048 A1* | 9/2012 | Matsumoto | 65/56 |
| 2012/0240628 A1* | 9/2012 | Matsumoto | 65/43 |
| 2012/0240629 A1* | 9/2012 | Matsumoto | 65/43 |
| 2012/0240630 A1* | 9/2012 | Matsumoto | 65/43 |
| 2012/0240631 A1* | 9/2012 | Matsumoto | 65/43 |
| 2012/0240632 A1* | 9/2012 | Matsumoto | 65/43 |
| 2012/0240633 A1* | 9/2012 | Matsumoto | 65/43 |
| 2012/0247153 A1* | 10/2012 | Matsumoto | 65/43 |
| 2012/0260694 A1* | 10/2012 | Matsumoto | 65/43 |
| 2012/0285200 A1* | 11/2012 | Tanaka | 65/43 |
| 2012/0287026 A1 | 11/2012 | Masuda | |
| 2012/0318023 A1* | 12/2012 | Shimomura | 65/43 |
| 2012/0320444 A1 | 12/2012 | Baur et al. | |
| 2013/0011598 A1* | 1/2013 | Kawanami et al. | 428/76 |
| 2013/0104980 A1* | 5/2013 | Sridharan et al. | 136/259 |
| 2013/0111953 A1* | 5/2013 | Maloney et al. | 65/43 |
| 2013/0134396 A1* | 5/2013 | Shimomura et al. | 257/40 |
| 2013/0174608 A1* | 7/2013 | Takeuchi et al. | 65/40 |
| 2013/0237115 A1 | 9/2013 | Choi et al. | |
| 2013/0280981 A1 | 10/2013 | Lee | |
| 2013/0314760 A1 | 11/2013 | Baur et al. | |

FOREIGN PATENT DOCUMENTS

| | | | |
|---|---|---|---|
| CN | 1798708 | 7/2006 | |
| CN | 1798710 | 7/2006 | |
| CN | 1836177 | 9/2006 | |
| CN | 101005915 | 7/2007 | |
| CN | 101095247 | 12/2007 | |
| CN | 101103429 | 1/2008 | |
| CN | 101139165 | 3/2008 | |
| CN | 100409392 C | 8/2008 | |
| CN | 101312234 | 11/2008 | |
| CN | 101386477 | 3/2009 | |
| CN | 101434453 | 5/2009 | |
| CN | 101501808 | 8/2009 | |
| CN | 102056858 | 5/2011 | |
| JP | 2-120259 | 5/1990 | |
| JP | 5-166462 | 7/1993 | |
| JP | 2000-313630 | 11/2000 | |
| JP | 2002-015108 | 1/2002 | |
| JP | 2002-224871 | 8/2002 | |
| JP | 2002-287107 | 10/2002 | |
| JP | 2002-366050 | 12/2002 | |
| JP | 2002-367514 | 12/2002 | |
| JP | 2002366050 A * | 12/2002 | .............. G09F 9/00 |
| JP | 2004-182567 | 7/2004 | |
| JP | 2005-007665 | 1/2005 | |
| JP | 2005-213125 | 8/2005 | |
| JP | 2006-151774 | 6/2006 | |
| JP | 2006-524419 | 10/2006 | |
| JP | 2007-90405 | 4/2007 | |
| JP | 2007-264135 | 10/2007 | |
| JP | 2008-115057 | 5/2008 | |
| JP | 2008-115067 | 5/2008 | |
| JP | 2008-127223 | 6/2008 | |
| JP | 2008-527655 | 7/2008 | |
| JP | 2009-123421 | 6/2009 | |
| JP | 2009-196859 | 9/2009 | |
| JP | 2009-196862 | 9/2009 | |
| KR | 10-2001-0084380 | 9/2001 | |
| KR | 10-0350323 | 3/2002 | |
| KR | 10-2007-0003681 | 1/2007 | |
| KR | 10-2008-0010446 | 1/2008 | |
| KR | 10-2008-0016457 | 2/2008 | |
| TW | I495409 | 7/2002 | |
| TW | 200516064 | 5/2005 | |
| TW | I255934 | 6/2006 | |
| TW | 200733787 | 9/2007 | |
| TW | 200737370 | 10/2007 | |
| TW | 200822789 | 5/2008 | |
| TW | 200911438 | 3/2009 | |
| TW | 200944908 | 11/2009 | |
| WO | WO 2007/067533 | 6/2007 | |
| WO | WO 2007067533 A2 * | 6/2007 | |
| WO | WO 2009/131144 | 10/2009 | |
| WO | 2009/150975 | 12/2009 | |
| WO | WO 2009/150976 | 12/2009 | |
| WO | WO 2009/157281 | 12/2009 | |
| WO | WO 2009-157282 | 12/2009 | |

OTHER PUBLICATIONS

U.S. Office Action dated Jun. 3, 2014 that issued in U.S. Appl. No. 13/511,683 including Double Patenting Rejections on pp. 5-11.
U.S. Office Action dated Jul. 2, 2014 that issued in U.S. Appl. No. 13/511,754 including Double Patenting Rejections on pp. 5-8.

(56) References Cited

OTHER PUBLICATIONS

U.S. Office Action dated Apr. 25, 2014 that issued in U.S. Appl. No. 13/511,721 including Double Patenting Rejections on pp. 2-3.
U.S. Office Action dated Jan. 16, 2014 that issued in U.S. Appl. No. 13/511,735 including Double Patenting Rejections on pp. 4-8.
U.S. Office Action dated Jan. 22, 2014 that issued in U.S. Appl. No. 13/509,112 including Double Patenting Rejections on pp. 4-5.
U.S. Office Action dated Jul. 1, 2014 that issued in U.S. Appl. No. 13/511,738 including Double Patenting Rejections on pp. 4-5.
U.S. Office Action dated Jul. 1, 2014 that issued in U.S. Appl. No. 13/511,747 including Double Patenting Rejections on pp. 4-5.
U.S. Office Action dated Jul. 31, 2014 that issued in U.S. Appl. No. 12/994,354 including Double Patenting Rejections on pp. 7-10.
JP 20022366050 (Human Translation), retrieved from USPTO Translation Services and attached to the U.S. Office Action dated Apr. 25, 2013 in U.S. Appl. No. 12/994,539.
JP 2008115057 (Human Translation), retrieved from USPTO Translation Services and attached to the U.S. Office Action dated Apr. 25, 2013 in U.S. Appl. No. 12/994,539.
U.S. Office Action dated Apr. 25, 2013 that issued in U.S. Appl. No. 12/994,539 including Double Patenting Rejections on pp. 5-8.
JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated May 9, 2013 that issued in U.S. Appl. No. 12/994,399 including Double Patenting Rejections on pp. 6-10.
U.S. Office Action dated Jan. 22, 2013 that issued in U.S. Appl. No. 13/345,199 including Double Patenting Rejections on pp. 6-8.
U.S. Office Action dated Feb. 24, 2015 that issued in U.S. Appl. No. 13/345,199 including Double Patenting Rejections on pp. 4-14.
U.S. Office Action dated Jun. 6, 2012 that issued in U.S. Appl. No. 13/345,199 including Double Patenting Rejections on pp. 5-8.
U.S. Office Action dated Jun. 28, 2012 that issued in U.S. Appl. No. 12/994,320 including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.

* cited by examiner

GLASS WELDING METHOD AND GLASS LAYER FIXING METHOD

TECHNICAL FIELD

The present invention relates to a glass fusing method which manufactures a glass fusing structure by fusing glass substrates to each other and a glass layer fixing method therefor.

BACKGROUND ART

Known as a conventional glass fusing method in the above-mentioned technical field is a method which burns a glass layer containing a laser-light-absorbing pigment onto one glass member along a region to be fused, then superposes the other glass member on the one glass member with the glass layer interposed therebetween, and irradiates the glass layer with laser light along the region to be fused, so as to fuse the glass members to each other.

Meanwhile, typical as a technique for burning a glass layer onto a glass member is one which removes an organic solvent and a binder from a paste layer containing a glass frit, a laser-light-absorbing pigment, the organic solvent, and the binder, so as to fix the glass layer to the glass member, and then heats the glass member having the glass layer fixed thereto in a firing furnace, so as to melt the glass layer, thereby burning the glass layer onto the glass member (see, for example, Patent Literature 1).

For fixing a glass layer to a glass member, techniques for removing organic matters (organic solvents and binders) from the glass layer by irradiation with laser light instead of heating in a furnace have also been proposed (see, for example, Patent Literatures 2 and 3). Such techniques can prevent functional layers and the like formed on glass members from being worsened by heating and inhibit the energy consumption from being increased by the use of the furnace and the heating time from becoming longer in the furnace.

CITATION LIST

Patent Literature

Patent Literature 1: Japanese Translated International Application Laid-Open No. 2006-524419
Patent Literature 2: Japanese Patent Application Laid-Open No. 2002-366050
Patent Literature 3: Japanese Patent Application Laid-Open No. 2002-367514

SUMMARY OF INVENTION

Technical Problem

However, there has been a case where burning a glass layer onto a glass member by irradiation with laser light and fusing glass members together with the glass layers interposed therebetween makes their fused state nonuniform.

In view of such circumstances, it is an object of the present invention to provide a glass fusing method which can manufacture a highly reliable glass fusing structure and a glass layer fixing method therefor.

Solution to Problem

Figure 10:
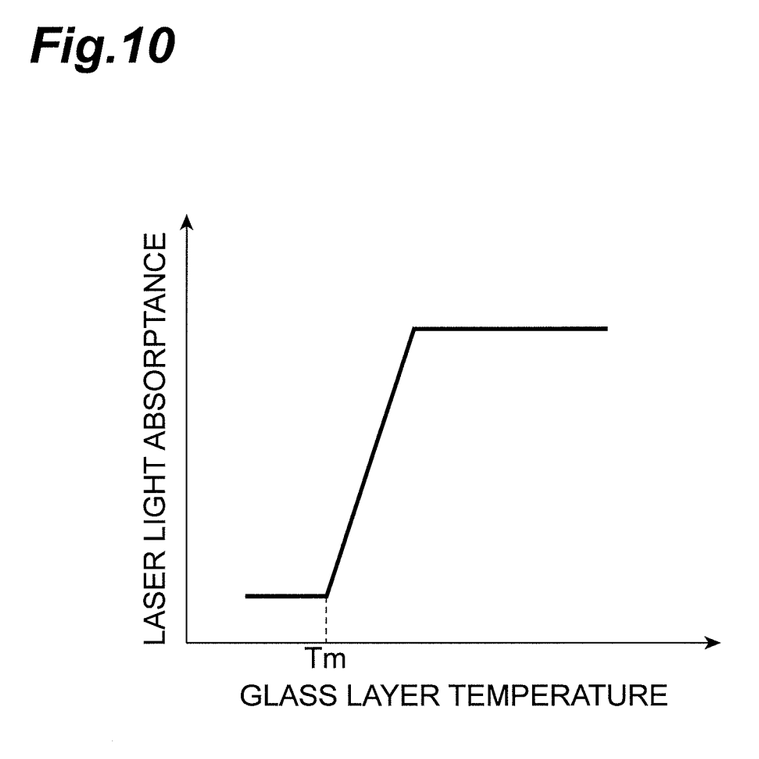
FIG. 10 is a graph illustrating the relationship between the temperature and laser light absorptance of the glass layer.

For achieving the above-mentioned object, the inventor conducted diligent studies and, as a result, has found out that the fusing state between glass members becomes nonuniform because of the fact that the laser light absorptance of the glass layer drastically increases when the temperature of the glass layer exceeds its melting point Tm as illustrated in FIG. 10 at the time of burning. That is, in the glass layer arranged on the glass member, scattering of light exceeding the absorption characteristic of the laser-light-absorbing pigment occurs because of the particle property of the glass frit and the like, so as to place it into a lower laser light absorptance state (e.g., it looks whiter under visible light). When the glass layer is irradiated with laser light in such a state in order to be burned onto the glass member, the glass frit loses its particle property upon melting and so forth, so that the absorption characteristic of the laser-light-absorbing pigment appears remarkably, whereby the laser light absorptance of the glass layer rises drastically (e.g., it looks darker or greener under visible light).

Figure 11:
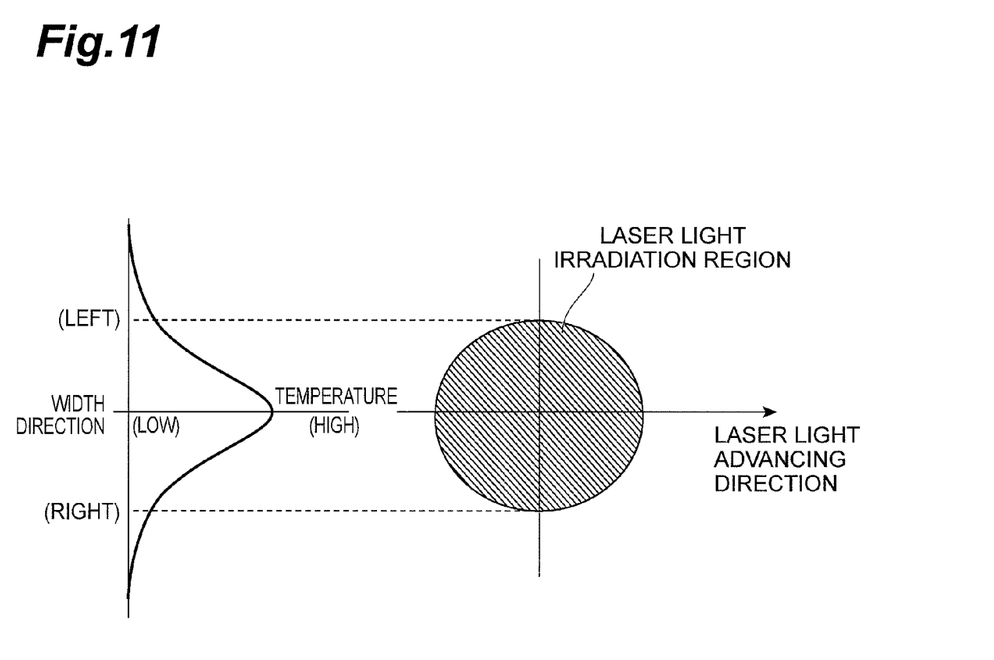
FIG. 11 is a chart illustrating a temperature distribution in laser irradiation.

Here, as illustrated in FIG. 11, the laser light has such a temperature distribution that the temperature is higher in a center part in its width direction (a direction substantially orthogonal to the advancing direction of the laser light). Therefore, when the laser light is advanced after staying at the irradiation start position for a while in order to yield a stable region in which the glass layer melts in the whole width thereof from the irradiation start position, the melting initially starting at the center part in the width direction may enhance the laser light absorptance at the center part, so as to place the center part into an excess heat input state, thereby generating cracks in the glass member or crystallizing the glass layer.

Figure 12:
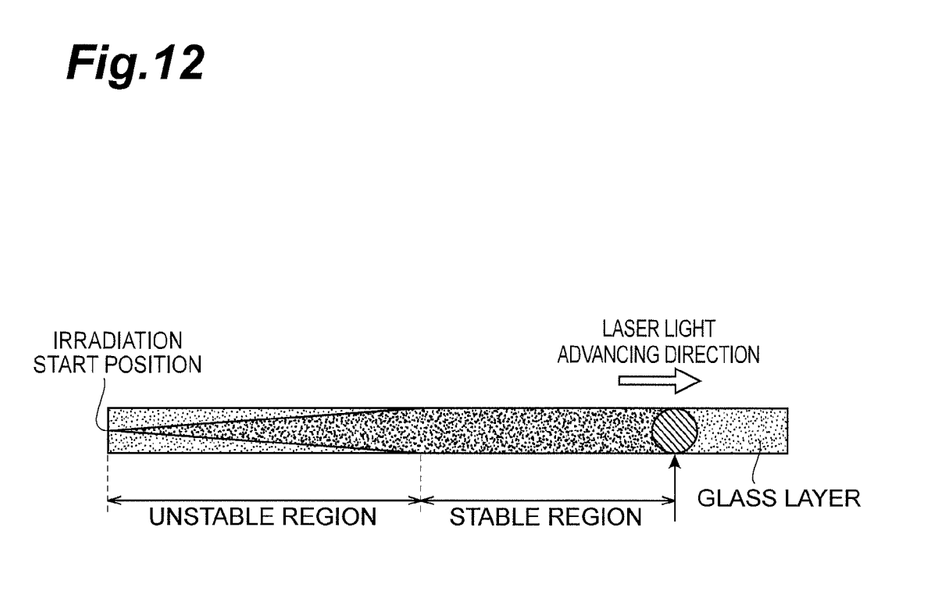
FIG. 12 is a diagram illustrating stable and unstable regions in laser irradiation.

Advancing the laser light when the glass layer is not molten in the whole width at the irradiation start position for the laser light as illustrated in FIG. 12 in view of the above makes a region extending from the irradiation start position to the stable region become an unstable region in which the width of melting gradually increases from its center portion. Fusing the glass members to each other with the glass layer having such an unstable region interposed therebetween produces the glass fusing structure with a nonuniform fusing state, since the laser light absorptance varies between the unstable and stable regions.

Further, the binder remains without fully decomposing in the unstable region. When glass members are fused to each other with the glass layer having such a region interposed therebetween, the glass layer solidifies before decomposition gases of the binder totally escape from the molten glass layer, since the melting point of the glass fit is higher than the decomposition point of the binder. This may form a number of bubbles in the glass layer, which, when joined together, may cause leaks in the glass layer in the glass fusing structure.

Based on the foregoing findings, the inventor has conducted further studies and completed the present invention. That is, the glass fusing method in accordance with the present invention is a glass fusing method for manufacturing a glass fusing structure by fusing first and second glass members to each other, the method comprising the steps of arranging a glass layer containing a binder, a laser-light-absorbing material, and a glass powder on the first glass member along a ring-shaped region to be fused; irradiating the glass layer with first laser light along the region to be fused from an irradiation start position in the region to be fused to the irradiation start position and then continuously again along a predetermined region from the irradiation start position in the region to be fused, so as to gasify the binder and melt the glass powder, thereby fixing the glass layer to the first glass member; and superposing the second glass member on the first glass member having the glass layer fixed thereto with the glass layer interposed therebetween and irradiating the glass layer with second laser light, so as to fuse the first and second glass members to each other.

The glass layer fixing method in accordance with the present invention is a glass layer fixing method for manufacturing a glass-layer-fixed member by fixing a glass layer to a first glass member, the method comprising the steps of arranging a glass layer containing a binder, a laser-light-absorbing material, and a glass powder on the first glass member along a ring-shaped region to be fused; irradiating the glass layer with first laser light along the region to be fused from an irradiation start position in the region to be fused to the irradiation start position and then continuously again along a predetermined region from the irradiation start position in the region to be fused, so as to gasify the binder and melt the glass powder, thereby fixing the glass layer to the first glass member.

When fixing the glass layer to the first glass member in the glass fusing method and glass layer fixing method, the glass layer is irradiated with the first laser light again along a predetermined region from the irradiation start position in the region to be fused, so as to re-melt in the predetermined region. Such re-melting can turn the predetermined region into a stable region, whereby the glass layer having reduced the unstable region in the region to be fused can be fixed to the first glass member. Further, the second irradiation with the first laser light can gasify the binder remaining in the unstable region and let it out from the glass layer. As a result, fusing the first and second glass members to each other with such a glass layer having reduced the unstable region interposed therebetween can homogenize the fusing state between the glass members. Therefore, the glass fusing method and glass fixing method can manufacture a highly reliable glass fusing structure. Here, the "stable region" means a region where the glass layer is molten in the whole width thereof, whereas the "unstable region" means a region where the glass layer is molten only in a part thereof in the width direction. The "ring shape" used herein includes at least circular and rectangular ring shapes.

Preferably, in the glass fusing method in accordance with the present invention, the predetermined region includes the whole of an unstable region where the melting of the glass layer is unstable when irradiated once with the first laser light from the irradiation start position. When the whole unstable region is included in the predetermined region to be irradiated again with the first laser light, the glass layer having further reduced the unstable region in the region to be fused can be fixed to the first glass member.

Preferably, in the glass fusing method in accordance with the present invention, the second irradiation with the first laser light along the predetermined region is performed with an irradiation power lower than that in the first irradiation with the first laser light along the predetermined region. The predetermined region, which has already been partly molten by the first irradiation with the first laser light, is re-molten by the lowered irradiation power, so as to be molten on a par with the other stable regions, whereby the melting in the region to be fused can be homogenized.

More preferably, in such a case, the irradiation power in the second irradiation with the first laser light along the predetermined region is gradually lowered. When the irradiation power is gradually lowered, the unstable region in which the ratio of the molten region gradually increases in the advancing direction of the first laser light can efficiently be turned into the stable region, so that the melting in the region to be fused can further be homogenized.

Advantageous Effects of Invention

The present invention can manufacture a highly reliable glass fusing structure.

DESCRIPTION OF EMBODIMENTS

In the following, preferred embodiments of the present invention will be explained in detail with reference to the drawings. In the drawings, the same or equivalent parts will be referred to with the same signs while omitting their overlapping descriptions.

Figure 1:
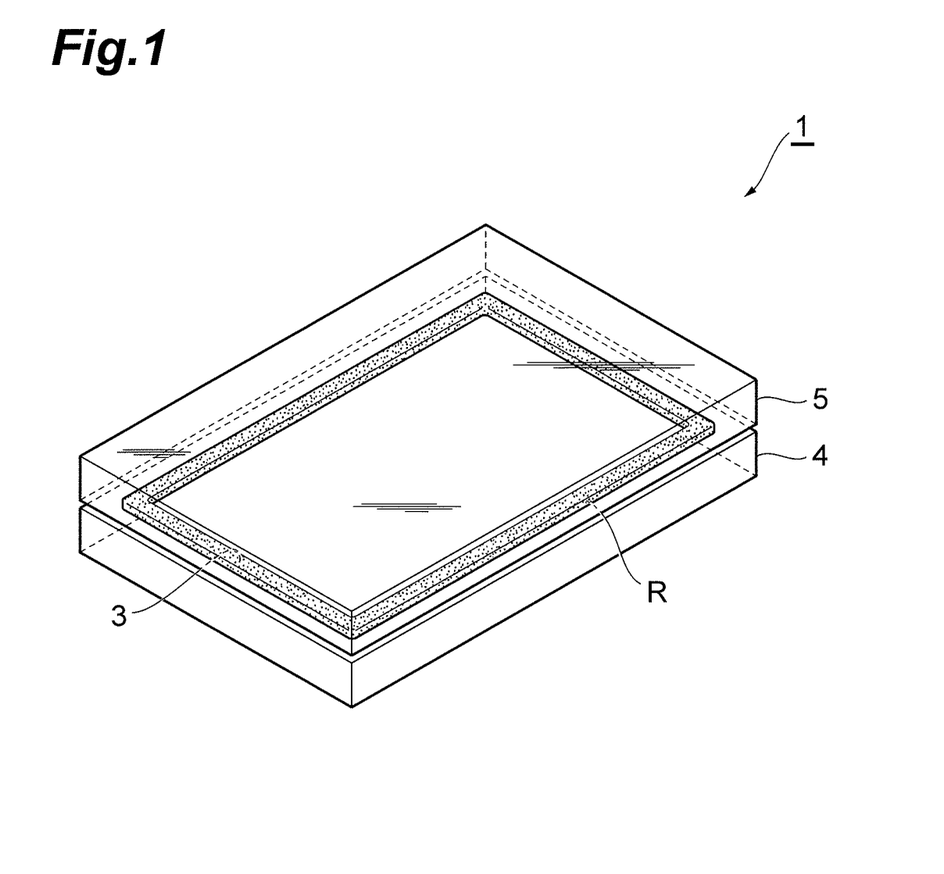
FIG. 1 is a perspective view of a glass fusing structure manufactured by an embodiment of the glass fusing method in accordance with the present invention.

FIG. 1 is a perspective view of a glass fusing structure manufactured by an embodiment of the glass fusing method in accordance with the present invention. As illustrated in FIG. 1, a glass fusing structure 1 is one in which a glass member (first glass member) 4 and a glass member (second glass member) 5 are fused to each other with a glass layer 3, which is formed along a region to be fused R, interposed therebetween. Each of the glass members 4, 5 is a rectangular sheet-shaped member having a thickness of 0.7 mm made of non-alkali glass, for example, while the region to be fused R is arranged like a rectangular ring with a predetermined width along the outer peripheries of the glass members 4, 5. The glass layer 3 is made of low-melting glass (vanadium-phosphate-based glass, lead-borate-based glass, or the like), for example, and formed into a rectangular ring with a predetermined width along the region to be fused R.

A glass fusing method (including a glass layer fixing method of producing a glass-layer-fixed member by fixing the glass layer 3 to the glass member 4 in order to manufacture the glass fusing structure 1 by fusing the glass members 4, 5 to each other) for manufacturing the glass fusing structure 1 will now be explained.

Figure 2:
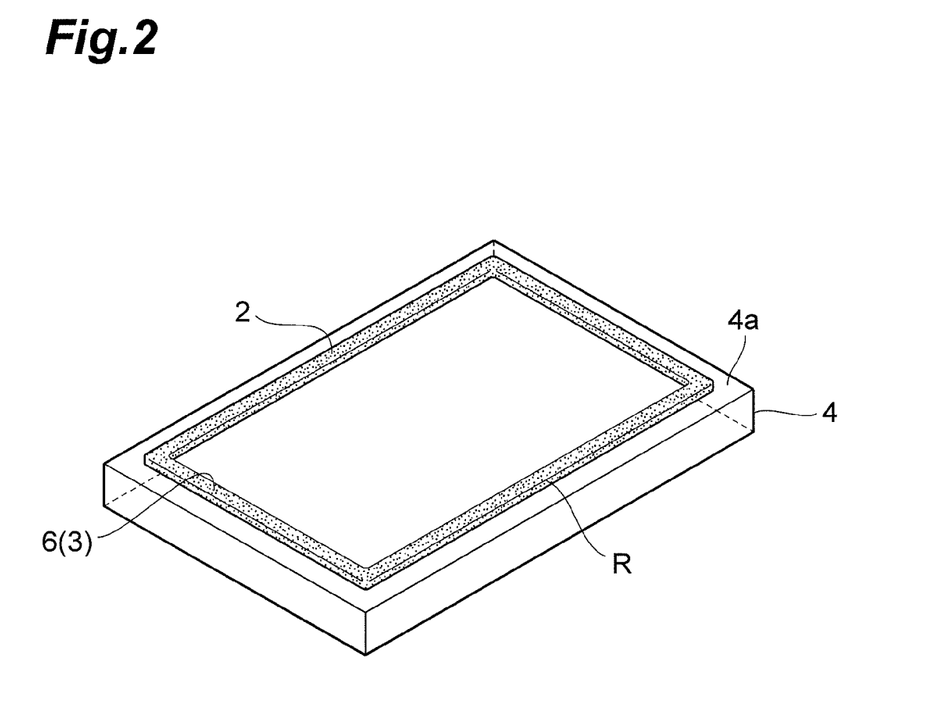
FIG. 2 is a perspective view for explaining the glass fusing method for manufacturing the glass fusing structure of FIG. 1.

First, as illustrated in FIG. 2, a frit paste is applied by a dispenser, screen printing, or the like, so as to form a paste layer 6 on a surface 4a of the glass member 4 along the closed-ring-shaped region to be fused R. An example of the frit paste is one in which a powdery glass fit (glass powder) 2 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (nitrocellulose, ethylcellulose, acrylic, or the like) thermally decomposable at the melting point temperature of the glass or lower are kneaded. The frit paste may also be one in which a glass fit (glass powder) produced by pulverizing low-melting glass doped beforehand with a laser-light-absorbing pigment (laser-light-absorbing material), an organic solvent, and a binder are kneaded. That is, the paste layer 6 contains the glass frit 2, laser-light-absorbing pigment, organic solvent, and binder.

Subsequently, the paste layer 6 is dried, so as to remove the organic solvent, whereby the glass layer 3 formed into a closed rectangular ring is secured to the surface 4a of the glass member 4 along the region to be fused R. As a consequence, the glass layer 3 containing the binder, laser-light-absorbing pigment, and glass frit 2 is arranged on the glass member 4 along the ring-shaped region to be fused R. Scattering of light exceeding the absorption characteristic of the laser-light-absorbing pigment occurs because of the particle property of the glass fit 2 and the like in the glass layer 3 secured to the surface 4a of the glass member 4, thereby placing it into a lower laser light absorptance state (e.g., it looks whiter under visible light).

Figure 3:
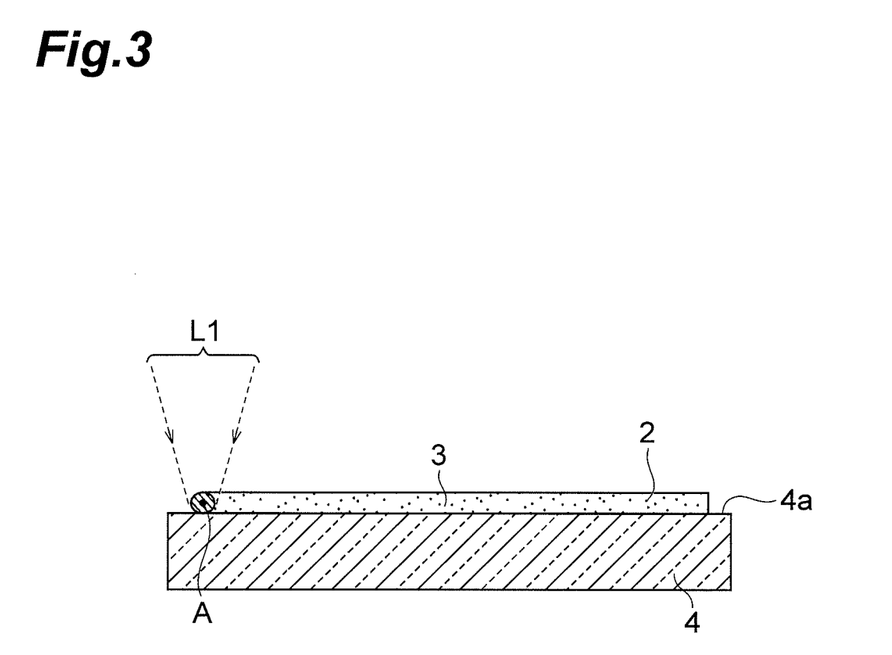
FIG. 3 is a sectional view for explaining the glass fusing method for manufacturing the glass fusing structure of FIG. 1.
Figure 4:
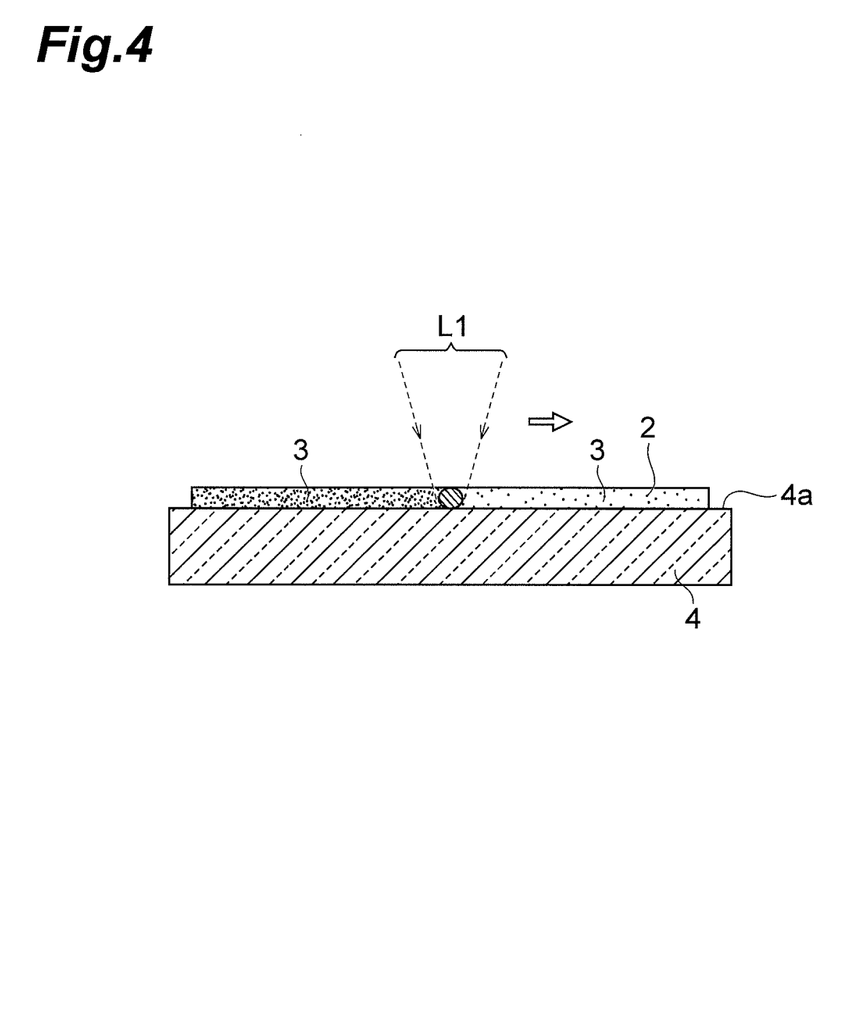
FIG. 4 is a sectional view for explaining the glass fusing method for manufacturing the glass fusing structure of FIG. 1.
Figure 5:
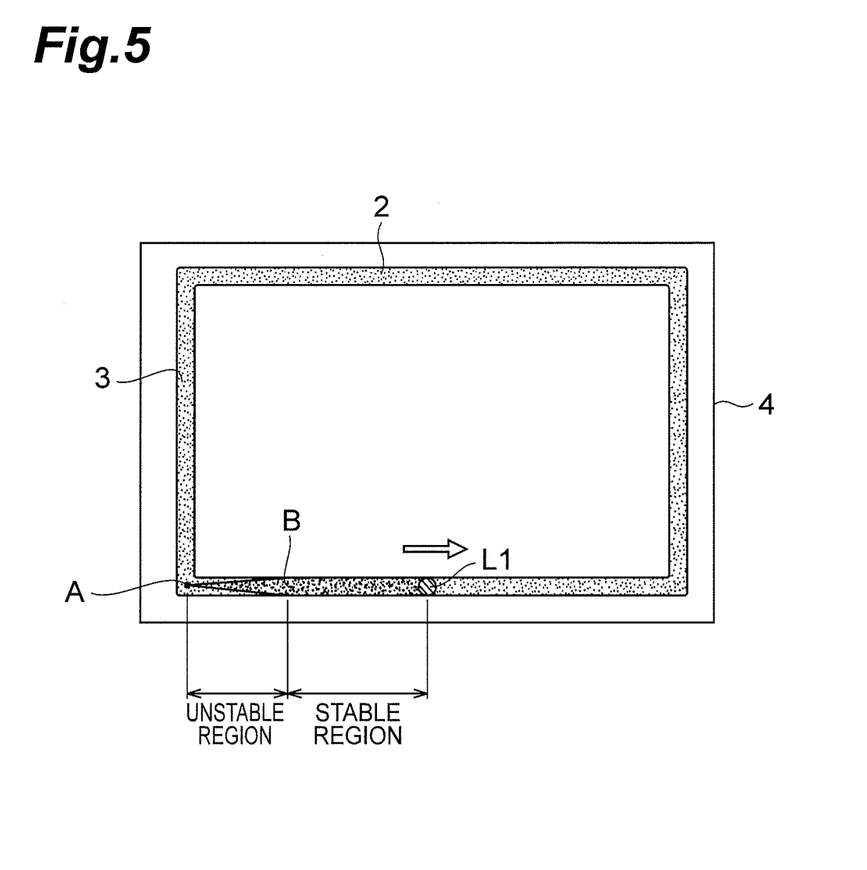
FIG. 5 is a plan view for explaining the glass fusing method for manufacturing the glass fusing structure of FIG. 1.
Figure 6:
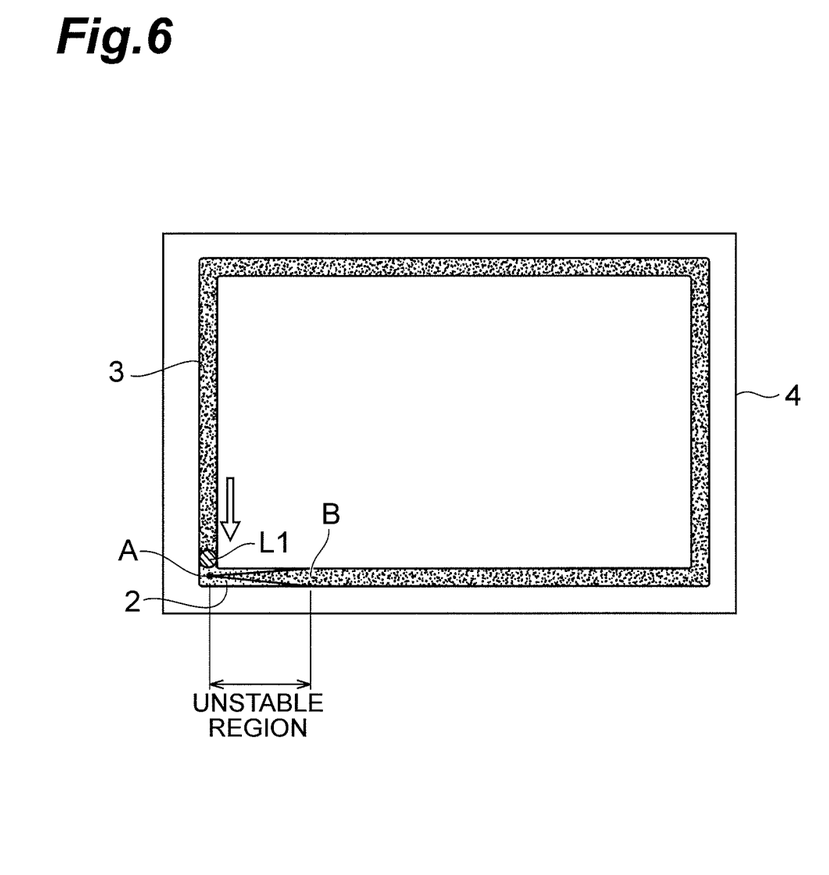
FIG. 6 is a plan view for explaining the glass fusing method for manufacturing the glass fusing structure of FIG. 1.

Next, as illustrated in FIGS. 3 to 5, irradiation with laser light (first laser light) L1 is started with a converging spot located at an irradiation start position A in the glass layer 3 and then is progressed in the advancing direction of the depicted arrow along the region to be fused R. Since the laser light L1 has the temperature distribution mentioned above (see FIG. 11), there is a predetermined distance from the irradiation start position A to a stable region start position B beginning to form a stable region in which the glass layer 3 melts as a whole in its width direction (a direction substantially orthogonal to the advancing direction of the laser light) as illustrated in FIG. 5, so that an unstable region in which the glass layer 3 melts partly in the width direction extends from the irradiation start position A to the stable region start position B. In the unstable region, the width by which the glass layer 3 is molten, i.e., the ratio of the molten region, gradually increases in the advancing direction of the laser light L1 as illustrated in FIG. 5 or 12.

Thereafter, the glass layer 3 is continuously irradiated with the laser light L1 along the region to be fused R beyond the stable region start position B until it returns to the irradiation start position A and then, as illustrated in FIG. 7, continuously again along the unstable region from the irradiation start position A to the stable region start position B where the melting of the glass layer 3 becomes stable, so as to re-melt the glass layer 3 in the unstable region. Since the unstable region has once gradually increased the ratio of the molten region in the laser light advancing direction by laser irradiation, the second laser irradiation along the unstable region gradually lowers the irradiation power of the laser light from the irradiation start position A so that it becomes zero near just beyond the stable region start position B.

Figure 7:
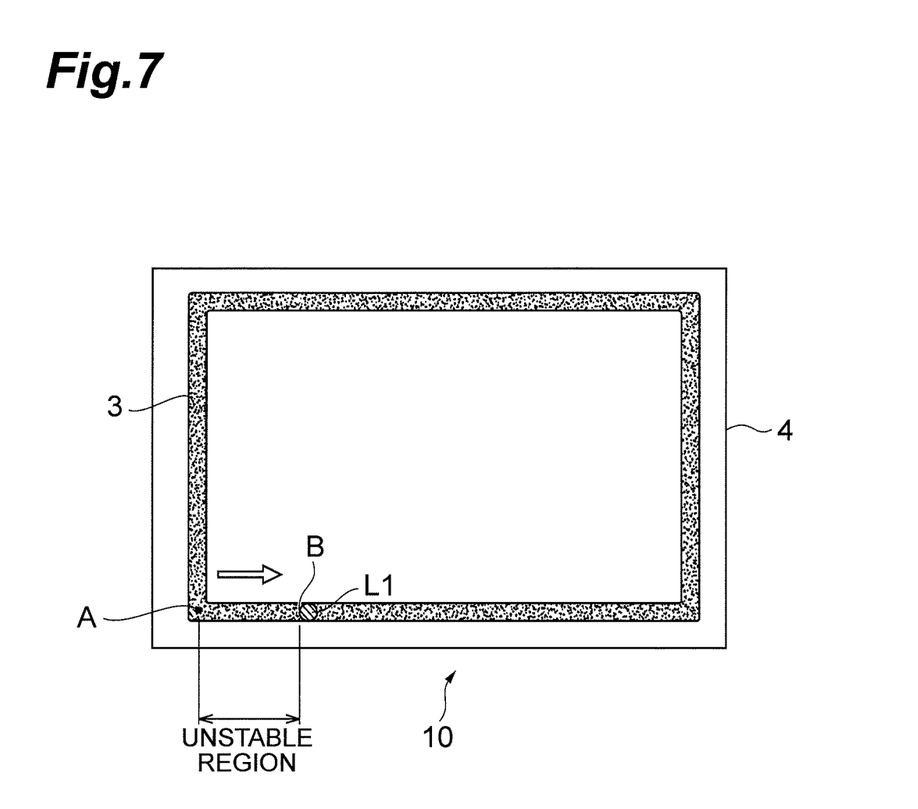
FIG. 7 is a plan view for explaining the glass fusing method for manufacturing the glass fusing structure of FIG. 1.

The irradiation with the laser light L1 with an overlap in the unstable region gasifies the binder and melts the glass frit 2 all around the region to be fused R of the glass layer 3 arranged on the glass member 4, so as to remove the binder and re-solidify the glass frit 2, thereby burning and fixing the glass layer 3 onto the surface 4a of the glass member 4. As a result, a glass-layer-fixed member 10 (i.e., the glass member 4 having the glass layer 3 fixed thereto) is produced as illustrated in FIG. 7. In the glass layer 3 burned onto the surface 4a of the glass member 4, the glass frit 2 melts, thereby losing its particle property and so forth, so that the absorption characteristic of the laser-light-absorbing pigment appears remarkably, thus yielding a higher laser light absorptance state (e.g., it looks darker under visible light).

Figure 8:
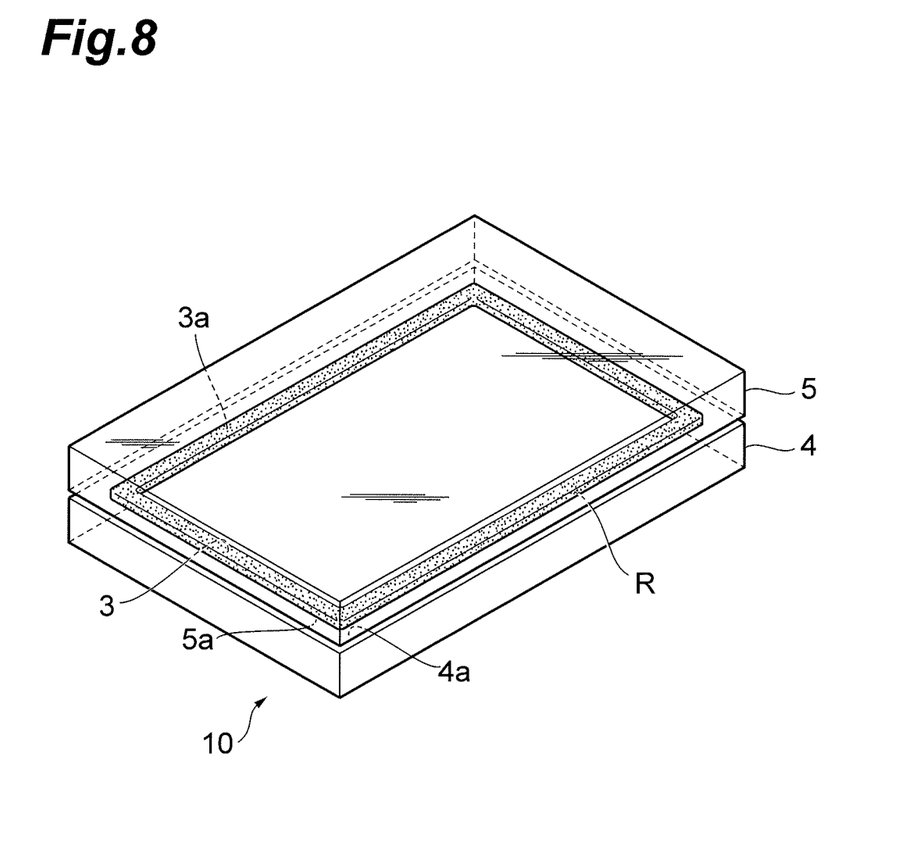
FIG. 8 is a perspective view for explaining the glass fusing method for manufacturing the glass fusing structure of FIG. 1.

After the burning of the glass layer 3, which is stable all around the region to be fused R, is completed, the glass member 5 is superposed on the glass-layer-fixed member 10 (i.e., the glass member 4 having the glass layer 3 fixed thereto) with the glass layer 3 interposed therebetween as illustrated in FIG. 8.

Figure 9:
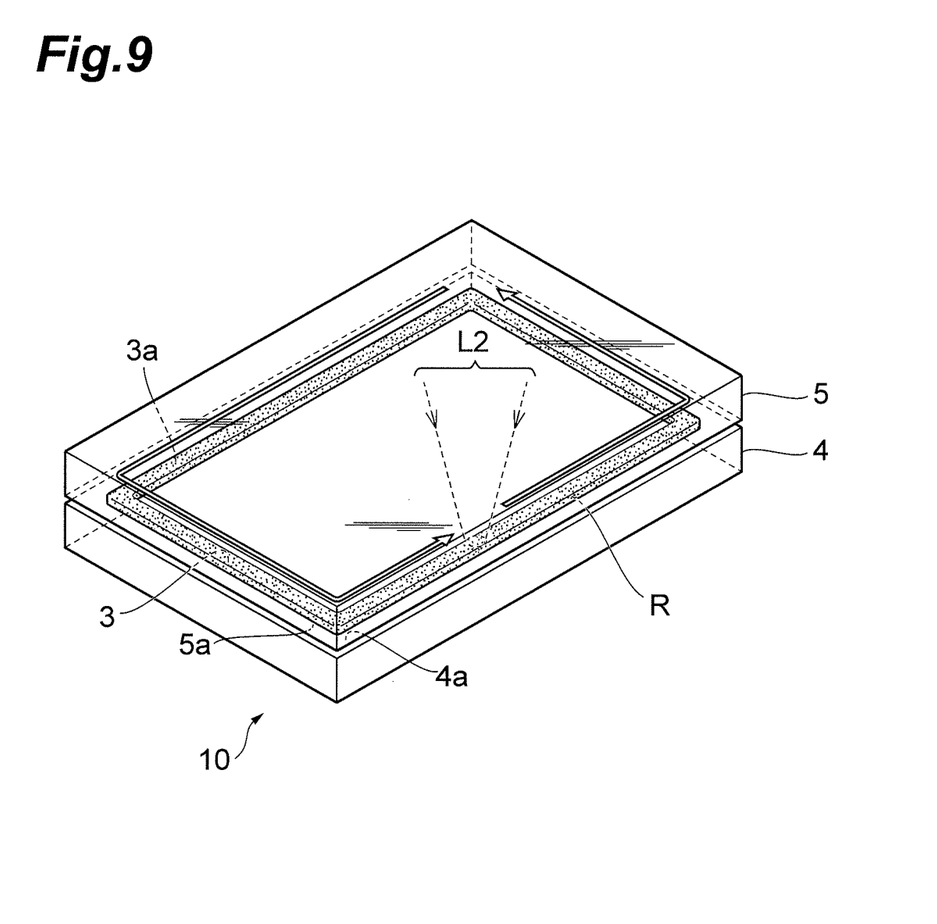
FIG. 9 is a perspective view for explaining the glass fusing method for manufacturing the glass fusing structure of FIG. 1.

Subsequently, as illustrated in FIG. 9, the glass layer 3 is irradiated with laser light (second laser light) L2 along the region to be fused R while locating a converging spot at the glass layer 3. As a consequence, the glass layer 3 in a uniform state with a high laser light absorptance all around the region to be fused R absorbs the laser light L2, so that the glass layer 3 and its peripheral parts (the parts of surfaces 4a, 5a of the glass members 4, 5) melt and re-solidify to about the same extent, thereby bonding the glass members 4, 5 to each other (there is also a case where not the glass members 4, 5 but the glass layer 3 melts in fusing). Here, the glass layer 3 burned onto the glass member 4 is formed as a stable region in which the melting thereof is stable all around the region to be fused R, while the binder is fully removed, whereby the glass members 4, 5 are uniformly fused along the region to be fused R.

As explained in the foregoing, when fixing the glass layer 3 to the glass member 4, the glass fusing method (including the glass layer fixing method) for manufacturing the glass fusing structure 1 irradiates the glass layer 3 with the laser light L1 again along the unstable region from the irradiation start position A in the region to be fused R to the stable region start position B in the region to be fused R, so as to re-melt the glass layer 3 in the unstable region. Such re-melting can turn the unstable region into a stable region, whereby the glass layer 3 in which the melting is stable all around the region to be fused can be fixed to the glass member 4. Further, the second irradiation with the laser light L1 can gasify the binder remaining in the unstable region and let it out from the glass layer 3. As a result, fusing the glass members 4, 5 to each other with the glass layer 3 formed with such a stable region interposed therebetween can homogenize the fusing state between the glass members 4, 5. Therefore, the foregoing glass fusing method and glass fixing method can manufacture the glass fusing structure 1 with high reliability.

In the above-mentioned glass fusing method, the irradiation power is gradually lowered in the second irradiation with the laser light L1 along the unstable region as compared with that in the first irradiation. When the irradiation power is thus gradually lowered, the unstable region in which the ratio of the molten region gradually increases in the advancing direction of the laser light L1 can efficiently be turned into the stable region, so that the melting in the region to be fused R can further be homogenized.

The present invention is not limited to the above-mentioned embodiment.

For example, while the above-mentioned embodiment uses the region to be fused R having a substantially rectangular ring shape, it may be any ring-shaped region to be fused, such as a circular ring-shaped region to be fused.

The glass layer 3 may be irradiated with the laser light L1 either directly as in the above-mentioned embodiment or through the glass member 4.

INDUSTRIAL APPLICABILITY

The present invention can manufacture a highly reliable glass fusing structure.

REFERENCE SIGNS LIST

1 . . . glass fusing structure; 2 . . . glass frit (glass powder); 3 . . . glass layer; 4 . . . glass member (first glass member); 5 . . . glass member (second glass member); 6 . . . paste layer; 10 . . . glass-layer-fixed member; A . . . irradiation start position, B . . . stable region start position; R . . . region to be fused; L1 . . . laser light (first laser light); L2 . . . laser light (second laser light)

What is claimed is:

1. A glass fusing method for manufacturing a glass fusing structure by fusing first and second glass members to each other, the method comprising the steps of:

arranging a glass layer containing a binder, a laser-light-absorbing material, and a glass powder on the first glass member along a ring-shaped region to be fused;

irradiating the glass layer in a first irradiation with first laser light along the region to be fused from an irradiation start position in the region to be fused to the irradiation start position and then continuously again in a second irradiation along a predetermined region from the irradiation start position in the region to be fused, so as to gasify the binder and melt the glass powder, thereby fixing the glass layer to the first glass member; and superposing the second glass member on the first glass member having the glass layer fixed thereto with the glass layer interposed therebetween and irradiating the glass layer with second laser light, so as to fuse the first and second glass members to each other, wherein the predetermined region includes the whole of an unstable region where the melting of the glass layer is unstable when irradiated once with the first laser light from the irradiation start position, wherein the unstable region is a region where the glass layer is molten only in a part thereof in the width direction, wherein in the unstable region, the glass layer melts such that the width of a molten region gradually increases from the center part in the advancing direction of the first laser light, wherein in the unstable region, both sides of the molten region in the width direction of the glass layer are unmelted parts of the glass layer, and wherein the binder remaining in the unmelted parts after the first irradiation with the first laser light is removed by the second irradiation, and the laser light absorptance is increased by melting the glass layer, and the laser light absorptance of the molten region of the glass layer is different from that of the unmelted parts of the glass layer.

2. A glass fusing method according to claim 1, wherein the second irradiation with the first laser light along the predetermined region is performed with an irradiation power lower than that in the first irradiation with the first laser light along the predetermined region.

3. A glass fusing method according to claim 2, wherein the irradiation power in the second irradiation with the first laser light along the predetermined region is gradually lowered.

4. A glass layer fixing method for manufacturing a glass-layer-fixed member by fixing a glass layer to a first glass member, the method comprising the steps of:

arranging a glass layer containing a binder, a laser-light-absorbing material, and a glass powder on the first glass member along a ring-shaped region to be fused; and irradiating the glass layer in a first irradiation with first laser light along the region to be fused from an irradiation start position in the region to be fused to the irradiation start position and then continuously again in a second irradiation along a predetermined region from the irradiation start position in the region to be fused, so as to gasify the binder and melt the glass powder, thereby fixing the glass layer to the first glass member, wherein the predetermined region includes the whole of an unstable region where the melting of the glass layer is unstable when irradiated once with the first laser light from the irradiation start position, wherein the unstable region is a region where the glass layer is molten only in a part thereof in the width direction, wherein in the unstable region, the glass layer melts such that the width of a molten region gradually increases from the center part in the advancing direction of the first laser light, wherein in the unstable region, both sides of the molten region in the width direction of the glass layer are unmelted parts of the glass layer, and wherein the binder remaining in the unmelted parts after the first irradiation with the first laser light is removed by the second irradiation, the laser light absorptance is increased by melting the glass layer, and the laser light absorptance of the molten region of the glass layer is different from that of the unmelted parts of the glass layer.

* * * * *